US005162141A

United States Patent [19]

Davey et al.

[11] Patent Number: 5,162,141

[45] Date of Patent: Nov. 10, 1992

[54] POLYMERIC SHEET HAVING AN INCOMPATIBLE INK PERMANENTLY BONDED THERETO

[75] Inventors: Raymond G. Davey, Lancaster; Charles H. Hines, Columbia; Kenneth K. Ko, West Grove; Walter J. Lewicki, Jr., Lancaster; Dean L. Putt, Lititz, all of Pa.

[73] Assignee: Armstrong World Industries, Inc., Lancaster, Pa.

[21] Appl. No.: 628,575

[22] Filed: Dec. 17, 1990

[51] Int. Cl.[5] .................................... B32B 3/02

[52] U.S. Cl. .................................... 428/76; 428/908.8; 428/913.3; 428/542.2; 428/542.6

[58] Field of Search .................... 428/76, 908.8, 913.3, 428/542.2, 542.6; 117/15

[56] References Cited

U.S. PATENT DOCUMENTS

| | | | |
|---|---|---|---|
| 3,667,983 | 6/1972 | Haggas | 117/15 |
| 3,808,024 | 4/1974 | Witman | 117/11 |
| 3,958,990 | 5/1976 | Parent | 96/1.4 |
| 4,701,837 | 10/1987 | Sakaki et al. | 346/135.1 |
| 4,801,497 | 1/1989 | Kono et al. | 428/332 |

FOREIGN PATENT DOCUMENTS

| | | |
|---|---|---|
| 0395233 | 10/1990 | European Pat. Off. . |
| 0414251 | 2/1991 | European Pat. Off. . |
| 1073825 | 6/1967 | United Kingdom . |
| 1123207 | 8/1968 | United Kingdom . |

*Primary Examiner*—Patrick J. Ryan
*Assistant Examiner*—Kam F. Lee

[57] ABSTRACT

The adhesive system of the present invention is suitable for use in adhering an incompatible ink system to a polymeric film; particularly, adhering a lithographic ink or electrographic toner bonded to a floor covering. The polymeric sheet and incompatible ink have a primer layer interposed between them or the ink layer is encapsulated between the two primer layers. The primer may be solvent based or aqueous based and preferably includes a benzene derivative, ketone, acetate or nitroparaffin solvent or film former. The primer is compatible with the polymeric sheet and diffuses into the ink layer. The preferred solvent or film former includes methyl isobutyl ketone, methyl ethyl ketone, n-propyl acetate, isopropyl acetate, or N-methyl-2-pyrrolidone. The primer also includes a polyvinyl resin, acrylic resin, polyurethane resin or polyester resin, and optionally a pigment. To deter dot distortion of the ink, the primer should have a glass transition temperature ($T_g$) of at least about 60° C., and preferably at least about 100° C.

18 Claims, No Drawings

POLYMERIC SHEET HAVING AN INCOMPATIBLE INK PERMANENTLY BONDED THERETO

BACKGROUND OF THE INVENTION

1. Field of the Invention

The present invention relates to an adhesive system which is suitable for use in adhering an incompatible ink system to a polymeric film. More particularly, the present invention relates to a polymeric sheet having an incompatible ink permanently bonded thereto, and specifically a floor covering having a lithographic ink or electrographic toner bonded to a primer which is bonded to the floor covering.

2. Related Art

The term incompatible refers to the inability of the ink system to directly and permanently bond to a polymeric sheet only through solvent or carrier evaporation. An example of a compatible system would be the case in a typical rotogravure vinyl ink system when it is printed onto a rigid polyvinyl chloride (PVC) film.

To create a high quality colored (nearly photographic, i.e., better that 150 line rotogravure) decorative design on surfaces of tile products, the rotogravure printing technique is the state of the art technique most often selected. While this printing technique is relatively easy to operate, it has some drawbacks. It is capital intensive, in that new designs require new printing cylinders prior to printing. It requires long lead times to prepare the cylinders for printing. In addition, this technique is geared to high volume printing and usually on relatively thin webs, i.e., 1.5 to 10 mils in thickness. Clean up of the printing cylinders is more time consuming than most of the actual print run, resulting in potentially high labor costs associated with the actual job, and a natural tendency to make the runs longer than are necessary.

In order to provide a lower cost, short run, and faster turnaround printing system, a departure was made from the current rotogravure printing system. Two high quality four color printing techniques, lithographic and electrographic printing, offered these opportunities. However, it became obvious that the conventional ink systems used in these techniques were not compatible with the polymeric films that are used in the manufacture of polymeric sheet products.

In the lithographic process, which can be a sheet-fed printing process, the inks cure by oxidation. After printing on rigid PVC film, the ink will still be soft after drying. The image will readily smudge and result in an unacceptable print. This actually occurs to some extent in normal conventional lithographic printing of paper today if one were to examine a four color process-printed page in a magazine or on an advertising poster. It has been found that when a conventional-lithographic printed PVC film is bonded conventionally to a floor tile base, the ink layer will not impart the proper adhesion requirements after lamination for an adequately performing product.

The same is true of the electrographic printing systems where the colored images are formed on the film using both liquid and dry toners. Even, when the electrographic printing (e.g., from a Savin color copying machine) is done on specially treated papers and films, the ink layer which is actually to act as the adhesive layer between the clear protective film and base or substrate after lamination is not strong enough to prevent delamination in use.

Scopp U.S. Pat. No. 3,725,184 discloses a coated vinyl film. The laminated article contains a polyvinyl chloride, polyvinyl acetate and polyvinyl alcohol layer interposed between an exposed vinyl layer and the printing on the surface of a vinyl core to improve the adhesion between the exposed layer and the printing ink. Scopp specifically teaches using an ink which is compatible with the vinyl core, whether the core is a calendered vinyl sheet or an extruded vinyl sheet. The compatible ink is applied most frequently by off-set lithography or dry off-set printing methods.

Wheeler U.S. Pat. No. 3,330.684 relates to printing ink compositions suited for printing on polymeric materials by lithographic and letterpress printing processes. The Wheeler inks include as essential constituents, dispersed spherulites of high density polyethylene, a colorant and a binder for the polyethylene and the colorant. The spherulites are dendritic spherulites of high density polyethylene having a density of at least 0.95.

Haggas et al. U.S. Pat. No. 3,667,983 discloses the use of conventional lithographic and letterpress inks which are printed on flexible thermoplastic sheets. Adhesion is improved by overcoating the printed ink with a synthetic lacquer which permeates the printwork and serves both as a bonding agent and as a protective coating. Haggas et al. state that the basic material of the synthetic lacquer must be selected to match the sheet material to be color printed. They recommend butyl methacrylate/methyl methacrylate copolymer based lacquer for polyvinyl chloride.

SUMMARY OF THE INVENTION

It is an object of the present invention to provide a polymeric sheet having an incompatible ink permanently bonded thereto, particularly a lithographic ink or electrographic toner.

A more particular object is to provide a polyvinyl, acrylic, polyurethane or polyester sheet with a lithographic ink or electrographic toner which will not smudge.

Another object is to provide a floor covering including a polymeric sheet and lithographic ink or electrographic toner which will have sufficient adhesion to permit the laminate structure to perform as a floor covering.

These and other advantages of the present invention will became apparent from the detailed description of the preferred embodiments which follows.

These objects are accomplished by a polymeric sheet and incompatible ink which have a primer layer interposed between the polymeric sheet and ink. The primer is compatible with the polymeric sheet and diffuses into the ink layers.

In an organic solvent based primer system, the solvent system preferably includes a benzene derivative, ketone, acetate or nitroparaffin solvent, more preferably toluene, methyl isobutyl ketone, methyl ethyl ketone, propyl acetate or isopropyl acetate. The binding materials of the same system may include resin such as a polyvinyl resin, acrylic resin, polyurethane resin or polyester resin, and optionally a pigment. To deter smudging of the ink, the primer should have a glass transition temperature ($T_g$) of at least about 60° C., and preferably at least about 100° C.

An aqueous based primer system preferably includes an aqueous colloidal dispersion of one of the abovelisted polymers. Also, the aqueous primers include a solvent or film former. The solvents or film formers may include pyrrolidones, piperidones and acetmides.

Performance of the floor covering and adhesion of the ink is improved by encapsulating the ink in the primer. The ink may be interposed between two layers of primer. In a preferred embodiment using a clear film which is backprinted, the primer layer, interposed between the ink and polymeric sheet, is clear and the other primer layer may be white or colored. Other options include any combination of clear and colored films and primers.

The floor covering preferably includes a polymeric wear layer such as clear polyvinyl, acrylic, polyurethane or polyester. The wear layer may be crosslinked.

DETAILED DESCRIPTION OF THE INVENTION

A primer containing certain resins and solvents, in either a solution or dispersion form (if water is the vehicle of preferred choice), is interposed between the polymeric sheet and incompatible ink or encapsulates the incompatible ink system and bonds it to the polymeric film. After solvent removal from the primer, permanent adhesion is achieved between the film and ink layer in the form of a scratch resistant image. Through additional post lamination steps the encapsulated ink layer can be directly bonded to other substrates to result in decorative products such as floor, wall, and ceiling tile products. This is achieved by conventional lamination with heat and pressure.

The primer described in this invention consists of an organic resin binder and an organic solvent or blend of solvents. In the vinyl polymer family, the organic resins can comprise polyvinyl chloride, polyvinyl acetate, carboxyl-modified vinyl chloride/vinyl acetate copolymers hydroxy-modified vinyl chloride/vinyl acetate copolymers, a blend of vinyl chloride/vinyl acetate/-maleic acid, and vinyl chloride/vinyl acetate/hydroxy alkyl acrylate. In addition, organic resins that will work include polymers and copolymers of acrylic and methacrylic acids and their esters, polyesters, polyurethanes, and vinyl butyral.

The solvents of this invention do not interact in any way chemically or physically with the ink system to cause adverse effects such as color bleed, image distortion, and milkiness in the polymeric film prior to or after lamination. The solvents may include methyl isobutyl ketone (MIBK), methyl ethyl ketone (MEK), isopropyl acetate, n-propyl acetate, propylene glycol monomethyl ether acetate, and 1-nitropropane. Singular solvents can be used in the application of the encapsulating medium. However, the solvent system sometimes needs to be modified in practice in order to achieve optimum balance between the application method of the primer, penetration of these materials into the film and around the ink layers, and drying.

The film may come from the polyvinyl, acrylic, polyester, and polyurethane families or copolymers thereof. The polymeric film is usually a clear film which is backprinted. Typically, for a decorative surface product for floors, walls and furniture, the film is a clear rigid PVC film which becomes the wear surface. Also, the film may consist of two layers in which one of the layers is crosslinked. For ceiling products, the film may be white, both primer layers are clear, and the printed image would be encapsulated and permanently bonded to the white film.

The primer resin should be compatible with the polymeric sheet. Typically polyvinyl, acrylic, polyurethane and polyester primer resins may be used with either PVC or acrylic sheets. Polyurethane and polyester primer resins may be used with polyurethane and polyester sheets.

While using primer resins of the same family as the polymeric sheet (e.g. a polyvinyl primer on a PVC sheet) will insure that the primer and sheet are compatible, as demonstrated by Examples 1 and 2, infra. the primer and sheet are not identical. The polymers have different molecular weights, glass transition temperatures and moieties attached to the backbone. Further, the primers are dissolved or dispersed in a solvent, whereas the sheet is not.

The ink systems which are used in this invention and are incompatible with the polymeric film include lithographic inks (conventional drying and UV cure) and electrographic toners. They may be classified as either dry or wet in their imaging form, i.e., the printing process. Neither ink system without the use of this invention will adhere by itself to a rigid PVC film after evaporation of their respective carriers. In addition to providing an excellent color gamut, they must be heat and light stable as well as resistant to alkali.

The base may be another film, a primed paper or board containing cellulosic and/or man-made fibers, a filled thermoplastic tile composition, a tile composition containing a filled (white) latex topcoat, and other base structures as well.

The use of these two imaging systems in making decorative surface covering products necessarily requires that the colored pigment system adheres well to the protective wear layer as well as the base structure. In floor and wall products, the base structure often is composed of plasticized polyvinyl chloride resins and inorganic fillers (such as limestone and silica). The wear layer can be a clear polymeric film such as PVC, polyester, acrylic, polyurethane, or combinations thereof. When the inks of these imaging systems are printed directly onto these types of films, and subsequently laminated onto a PVC floor base structure using conventional flooring laminating conditions, the lamination is not successful. The adhesion of the pigment/resins used in both of these imaging systems between itself, the wear layer, and base, is unacceptable.

In order to guarantee the permanent adhesion required for performance, a primer is applied first to the polymeric film and then to the back of the decorated image. Thus, the image becomes encapsulated between the primers on the polymeric film. It remains stable while it is either in a stack of films or wound up within a roll of film. It will not block in either case and can be reactivated at any time the correct lamination conditions are present.

In the second preferred embodiment, the resin system used in the two primer layers will crosslink at temperatures typically at 80° C. to 140° C. to further enhance smudge resistance, e.g. improve resistance to dot distortion. This is especially valuable during subsequent operations where heat and pressure may other wise distort the image.

The primer in an aqueous based system preferably includes an aqueous colloidal dispersion of the polymer resins identified with respect to the organic solution primers above. Preferably the resins include acrylics, urethanes and polyvinyl acetates. Examples of the dispersion resins include S 575, a polyvinyl acetate dispersion, manufactured by Armstrong World Industries, Lancaster, PA, Tredfast 108, an acrylic dispersion manufactured by Tetrabond PLC, United Kingdom, Permuthane UE-40-570, Permuthane UE-41-510, Permuthane UE-41-512, (all urethane dispersions manufactured by Permuthane Coatings, Peabody, MA), Aquathane 60 a urethane dispersion manufactured by Peerless Emulsions, Ltd, Australia, NeoRez XR-9409 and NeoRez XR-9679 (both urethane dispersions manufactured by ICI Resins, Wilmington, MA, and combinations thereof.

The preferred dispersion has about 30% to 45% solids and an organic solvent. The preferred solvents which may be used to improve the performance of the dispersed resins include about 5% to about 15% by weight of N-methyl-2-pyrrolidone solvent and about 0.5% to about 2.0% by weight of N,N-diethylethanamine. Other solvents include N-methyl piperidone and N,N-dimethyl acetamide.

Optional surfactants include an ethylene glycol/ethyl alcohol mixture such as Permuthane KM-10-1610. Such surfactants may be added up to 2% or as needed.

The aqueous based primer also preferably includes a crosslinking catalyst to enhance smudge resistance. The catalysts include isocyanate (e.g. KM-10-1880 manufactured by Permuthane Coatings, Peabody, MA), carbodimide (e.g. KM-10-1869 manufactured by Permuthane Coatings), aziridine (e.g. KM-10-1703 manufactured by Permuthane Coatings) and hexamethoxylated melamine resins (e.g. Resimene R475 manufactured by Monsanto).

EXAMPLE 1

Lithographic Printing System

A 20 mil thick clear rigid PVC film in sheet form, made by Klockner Pentaplast, Gordonville, Va. was gravure-coated with a clear primer made according to Formula 1, below.

Formula 1

20% by weight VAGH, a hydroxy-modified polyvinyl chloride/vinyl acetate copolymer manufactured by Union Carbide Corp.
80% by weight methyl isobutyl ketone The coating was done with a 150 line overall knurl cylinder with two passes through the coater. The coating was air-dried to remove the carrier solvent. The amount of primer applied was 3–4 grams/square meter dry. The coating was printed with conventional air-dry lithographic inks supplied by the R. W. Rexford Company, Philadelphia, Pennsylvania. The inks were printed onto the dry clear primer according to the following sequence: Black P2200A, Cyan P2201A, Magenta P2202A, and Yellow P2203A. The design was a four color process print representing a ceramic floor tile configuration. After overnight drying, the white primer of Formula 2 below was applied over the dried lithographic inks at the dry weight rate of 7–9 grams/square meter and air-dried.

Formula 2

20% by weight $TiO_2$ pigment
80% by weight Formula 1

The back-printed 20 mil thick clear rigid PVC sheet was then post-laminated to a limestone-filled tile base formulation to make a floor tile product. The conditions of lamination in a two-stage press were as follows: 325 degrees Fahrenheit, 20 seconds, 100 psi for heating, and 100 degrees F, 20 seconds, 100 psi for cooling. By placing different texturing means against the unprinted side of the film, various textural surface features were imparted to the face of the product during the lamination operation. A smooth and overall finely textured surface having depth of 1 mil was produced as well as a more deeply embossed-in-register product where the depths were measured as much as 15 to 25 mils in depth. Adhesion between the 20 mil wear layer film and the floor tile base was excellent and found to be better than the adhesion when rotogravure inks are used as the ink layer.

EXAMPLE 2

Electrographic Printing System

The same primer Formula 1 was applied to a 3 mil clear rigid PVC film made by Klockner Pentaplast, Gordonville, Va. In this case, the primer was applied by a knife blade coater and air-dried. The same application rate was applied as in Example 1.

To the dried surface was applied colored liquid toners supplied by Hilord Chemical Corporation. The toners that were applied sequentially were: Cyan #100, Magenta #100, and Yellow #100. The toners were applied using a modified electrographic imaging and developing system. The electrostatic imaging was provided by an ionographic deposition technique. After evaporation of toner carrier, another thickness of Formula 1 was applied and dried in the same manner. The post lamination and texturing steps of Example 1 were used with a filled PVC tile base formulation to make a conventional floor tile product. The resulting PVC surface contained an embossing texture that was 6–10 mils deep and the adhesion between the protective film, toned image, and the tile base was permanent.

EXAMPLE 3

Higher $T_g$ Primer

While the above inks were permanently bonded to the polymeric sheet, they did have a tendency to distort in the post laminating and embossing steps. This tendency to distort was reduced by increasing the $T_g$ of the primer resin from the 68° C. of Examples 1 and 2 to 105° C. by substituting a methyl methacrylate polymer (Acryloid A-21, manufactured by Rohm and Haas, Philadelphia, Pa.) for the VAGH of Formula 1 and a solvent comprising methyl ethyl ketone/isopropyl acetate/propyl acetate in a ratio of 1:1:1 for the MIBK of Formula 1.

EXAMPLE 4

Aqueous Based Lithographic System

A 20 mil thick clear rigid PVC film in sheet form, made by Klockner Pentaplast, Gordonville, Va. was blade coated with a dispersion consisting of Permuthane UE-40-570 having a solids content of 33% by weight. The water based dispersion was applied at 0.001 inch wet thickness by hand drawdown, using a 1 mil Bird Blade coater. The amount of coating applied was 3–4 grams/square meter dry.

The coating was then printed via a hand rubber roller with a conventional air dry lithographic ink supplied by the R. W. Rexford Company, Philadelphia, PA. After drying overnight, the Permuthane UE-40-570 was applied over the dried lithographic inks at the dry weight rate of 3–4 grams/square meter and post-laminated to a limestone-filled tile base formulation to make a floor tile product using the same technique as described in Example 1. Adhesion between the 20 mil wear layer film and the floor tile base was excellent.

Though the inventors do not wish to be limited to the following explanation, they believe the improved adhesion results from the solvents of the primer diffusing into the lithographic ink layers or electrographic toner layers carrying the VAGH or A-21 resin with it. Then when the layers are laminated, the resins in the ink fuse with the resins in the primer and polymeric sheet.

The preferred application rate of the clear backcoated primer layer is three to four grams/square meter dry. However, the application rate could be as low as two grams/square meter dry and obtain adequate adhesion. The upper limit to the application rate depends merely on the cost of the applied primer.

For use in floor coverings, the preferred application rate of the white primer which is interposed between the base sheet and ink is seven to nine grams/square meter dry. However, the application rate could be as low as about six grams/square meter dry, particularly if there are open areas in the ink layer. The upper limit to the application rate depends merely on the cost of the applied primer.

What is claimed is:

1. A polymeric sheet having an incompatible ink permanently bonded thereto, the ink being bonded to the polymeric sheet by a first primer layer and a second primer layer, the first primer layer being interposed between the polymeric sheet and the ink, the ink being interposed between the first and second primer layers, the first and second primer layers being compatible with the polymeric sheet, and wherein, during application of the primer, the primer of the first and second primer layers comprises a solvent selected from the group consisting of benzene derivatives, ketones, acetates, nitroparaffins, pyrrolidones, piperidones and acetamides.

2. The sheet of claim 1, wherein the ink is selected from the group consisting of a lithographic ink and an electrographic toner.

3. The sheet of claim 1 wherein, during application of the primer, the primer comprises an aqueous dispersion.

4. The sheet of claim 1 wherein the primer comprises a solvent selected from the group consisting of toluene, methyl isobutyl ketone, methyl ethyl ketone, isopropyl acetate, n-propyl acetate, propylene glycol monomethyl ether acetate, 1-nitropropane, N-methyl-2-pyrrolidone, N-methyl-piperidone and N,N-dimethylacetamide.

5. The sheet of claim 1 wherein the primer comprises a resin which diffuses into the ink layer.

6. The sheet of claim 5 wherein the primer resin is selected from the group consisting of polyvinyl, acrylic, polyurethane, polyester and copolymers thereof.

7. The sheet of claim 6 wherein the polyvinyl is selected from the group consisting of polyvinyl chloride, polyvinyl chloride/polyvinyl acetate copolymer, hydroxy modified polyvinyl chloride/vinyl acetate copolymer and carboxyl modified polyvinyl chloride/vinyl acetate copolymer.

8. A polymeric sheet having an incompatible ink permanently bonded thereto, the ink being bonded to the polymeric sheet by a first primer layer, the primer layer being interposed between the polymeric sheet and the ink, the primer being compatible with the polymeric sheet, the primer comprising methyl methacrylate polymer or copolymers thereof, wherein during application of the primer, the primer comprises a solvent selected from the group consisting of benzene derivatives, ketones, acetates, nitroparaffins, pyrrolidones, piperidones and acetamides, and wherein the primer diffuses into the ink layer.

9. A polymeric sheet having an incompatible ink permanently bonded thereto, the ink being bonded to the polymeric sheet by a first primer layer, the primer layer being interposed between the polymeric sheet and the ink, the primer being compatible with the polymeric sheet, wherein during application of the primer, the primer comprises a solvent selected from the group consisting of benzene derivatives, ketones, acetates, nitroparaffins, pyrrolidones, piperidones and acetamides, and wherein the primer has a glass transition temperature of at least about 60° C.

10. The sheet of claim 9 wherein the primer has a glass transition temperature of at least about 100° C.

11. The sheet of claim 1 wherein the polymeric sheet is selected from the group consisting of polyvinyl, acrylic, polyurethane, polyester and copoylmers thereof.

12. The sheet of claim 1 wherein the primer layer is clear.

13. The sheet of claim 1 wherein the first primer layer adjacent the polymeric sheet is clear and the second primer layer is white.

14. A floor covering comprising the sheet, primer layers and ink of claim 1.

15. The floor covering of claim 14 wherein the first primer layer adjacent the polymeric sheet is clear and the second primer layer is white.

16. The floor covering of claim 14 further comprising a crosslinked wear layer.

17. A polymeric sheet having an incompatible ink permanently bonded thereto, the polymeric sheet being a rigid PVC sheet, the ink being bonded to the polymeric sheet by a first primer layer, the primer layer being interposed between the polymeric sheet and the ink, the primer being compatible with the polymeric sheet, wherein during application of the primer, the primer comprises a solvent selected from the group consisting of benzene derivatives, ketones, acetates, nitroparaffins, pyrrolidones, piperidones and acetamides.

18. A floor covering comprising a polymeric sheet having an incompatible ink permanently bonded thereto, the polymeric sheet being a rigid PVC sheet, the ink being bonded to the polymeric sheet by a first primer layer, the primer layer being interposed between the polymeric sheet and the ink, the primer being compatible with the polymeric sheet, wherein during application of the primer, the primer comprises a solvent selected from the group consisting of benzene derivatives, ketones, acetates, nitroparaffins, pyrrolidones, piperidones and acetamides.

* * * * *